(12) United States Patent
Shelton et al.

(10) Patent No.: US 6,741,683 B1
(45) Date of Patent: May 25, 2004

(54) ON-HOLD MESSAGE UPDATING SYSTEM AND METHOD

(76) Inventors: Charles Michael Shelton, 2514 Tangley, Houston, TX (US) 77005; Mark A. Wilder, 2514 Tangley, Houston, TX (US) 77005

( * ) Notice: Subject to any disclaimer, the term of this patent is extended or adjusted under 35 U.S.C. 154(b) by 0 days.

(21) Appl. No.: 10/324,915

(22) Filed: Dec. 20, 2002

Related U.S. Application Data

(60) Provisional application No. 60/342,777, filed on Dec. 21, 2001.

(51) Int. Cl.[7] ............................................. H04M 11/00
(52) U.S. Cl. ................................................ 379/101.01
(58) Field of Search ........................... 379/101.01, 162, 379/163, 374.01, 93.01, 90.01

(56) References Cited

U.S. PATENT DOCUMENTS

| | | | | |
|---|---|---|---|---|
| 4,920,556 A | * | 4/1990 | Wong | 379/101.01 |
| 5,497,502 A | | 3/1996 | Castille | 455/5.1 |
| 5,596,750 A | | 1/1997 | Li et al. | 395/671 |
| 5,699,526 A | | 12/1997 | Siefert | 395/227 |
| 5,918,213 A | | 6/1999 | Bernard et al. | 705/26 |
| 5,942,986 A | | 8/1999 | Shabot et al. | 340/825.44 |
| 5,963,964 A | | 10/1999 | Nielsen | 707/501 |
| 5,991,374 A | | 11/1999 | Hazenfield | 379/101.01 |
| 6,032,177 A | | 2/2000 | O'Donnell | 709/204 |
| 6,047,129 A | | 4/2000 | Frye | 395/712 |
| 6,064,723 A | | 5/2000 | Cohn et al. | 379/88.14 |
| 6,111,539 A | | 8/2000 | Mannings et al. | 342/357.09 |
| 6,121,593 A | | 9/2000 | Mansbery et al. | 219/679 |
| 6,145,088 A | | 11/2000 | Stevens | 714/2 |
| 6,168,563 B1 | | 1/2001 | Brown | 600/301 |
| 6,247,644 B1 | | 6/2001 | Horne et al. | 235/380 |
| 6,260,067 B1 | | 7/2001 | Barnhouse et al. | 709/224 |
| 6,261,103 B1 | | 7/2001 | Stephens et al. | 434/276 |
| 6,272,211 B1 | | 8/2001 | Hazenfield | 379/162 |
| 6,526,041 B1 | * | 2/2003 | Shaffer et al. | 379/393 |
| 2001/0043692 A1 | * | 11/2001 | Lee | 379/162 |

* cited by examiner

Primary Examiner—Stella Woo
(74) Attorney, Agent, or Firm—Kenneth H. Johnson

(57) ABSTRACT

A local protractive message on hold device, which contacts and interacts with a server, in order to receive from the server the audio programming and to install and alter the audio programming on the message on hold device. The device may interact with said server by any sort of electronic communication medium capable of transmitting digitized information as binary code or as binary code embedded in a text format based on ASCII. The local protractive device identifies itself to the server, then either the local device or the server checks specific areas within the storage system of the server to see if there are programming changes available for the local device. If there are no changes available in the storage system of the server; local device terminates its link to said server and then resumes normal operation. If, however, there are changes available to said local device, either the local device or the server downloads the files necessary to implement those changes prior to terminating its link with the server. The local protractive device then implements the programming changes made available to it via the communications link with the server. Upon completing implementation of the changes found on the server, the local protractive device then resumes normal operations.

12 Claims, 2 Drawing Sheets

ON-HOLD MESSAGE UPDATING SYSTEM AND METHOD

This application claims the benefit of provisional application 60/342,777 filed Dec. 21, 2001.

BACKGROUND OF THE INVENTION

1. Field of the Invention

The present invention relates to message on hold systems. More particularly it discloses a system in which a local message on hold device contacts a central server and secures changes to the audio program from the centralized server and installs them onto the local device.

2. Related Information

Message on hold systems are typically used to play back messages over telephone systems to callers placed on hold, but can be used to play messages over public address systems or other audio broadcast systems. Most of the users of such local devices do not have the requisite facilities to produce the audio programming played on these kinds of local devices and purchase both the messages on hold local device, as well as the services necessary for the production of audio programming from music on hold providers.

With devices that use magnetic or optical storage media installed in the local device, the media must first be produced, then shipped, then installed at the user's site. Although this seems to be a fairly simple procedure, experience has proven it to be rife with hazards. There are other types of devices which have their programs installed by electronic upload from the music on hold provider's studio facilities such as that disclosed in U.S. Pat. No. 5,991,374. These local devices are of two basic types, i.e., those which receive their audio programming by digital signal over a telephone line and those which receive their audio programming by analog signal over the telephone line. With either type of these devices, it is necessary for the music on hold provider to contact the device and then upload the audio programming to the device as either an analog transmission or as a digital file transferred over the telephone line.

Such prior systems are also problematical for both providers and the users whenever a user requires changes to their audio program. With devices employing removable media, to make even a minor change to the audio program, it is necessary to replace the storage media from which it is played by the local device in its entirety. These devices require that the user instigate changes to their audio programs with long lead times, because it is necessary for the provider to change the audio program, store the newly produced programming on the media, and then ship the media to the user's location. Assuming the media has arrived at the specified location on time and in working order, the user must then install the new media. There are many points for potential error in this lengthy process. Even though the newer of these kinds of devices perform reliably once the media is installed, the process of getting the media to the device has often proved troublesome.

Currently, there are two types of systems that overcome the difficulties inherent in using storage media installed at the local device, by uploading audio programming to the devices from the provider's studio facilities. The primary drawback to this approach is that it causes the provider to incur considerable costs for the telephone lines necessary for handling the traffic as well as long distance charges. Additionally, there is the problem of scheduling labor at the studio to do this work, or having hardware dedicated to calling the local devices and uploading the audio programs automatically.

With the present invention, many of these costs are either reduced or eliminated. With this system, the message on hold provider uploads new, or revised audio programming to a storage device, such as a server, which is accessed by the local device in an ordered manner to seek and recover audio program changes specifically for the particular local device.

SUMMARY OF THE INVENTION

The present invention briefly relates to:

(1) a system for updating messages on hold audio programs comprising:
   a local device programmed to play an audio program for broadcast over telephone lines for a) initiating contact with a server, b) determining if audio program changes are available from said server for said local device, c) downloading files for said local device from said server and d) installing the audio programming changes into said local device,
   a communication link and
   said server for storing program changes for said local device and being operably connected to said local device through said communication link;

(2) the method of operation of the system; and (3) the local device.

The local device component of the present system is a proactive local device for playback of messages to music on hold compatible telephone systems and other message output devices, and comprises a central processing unit, a digital signal processing unit, a digital to analog converter, a communications link device or devices, random access memory, nonvolatile random access memory, electronically programmable read-only memory, read-only memory, and associated support circuitry such as but not limited to, a power supply, as well as operating system software specifically configured to meet the needs of said proactive message on hold device.

DETAILED DESCRIPTION

Figure 1:
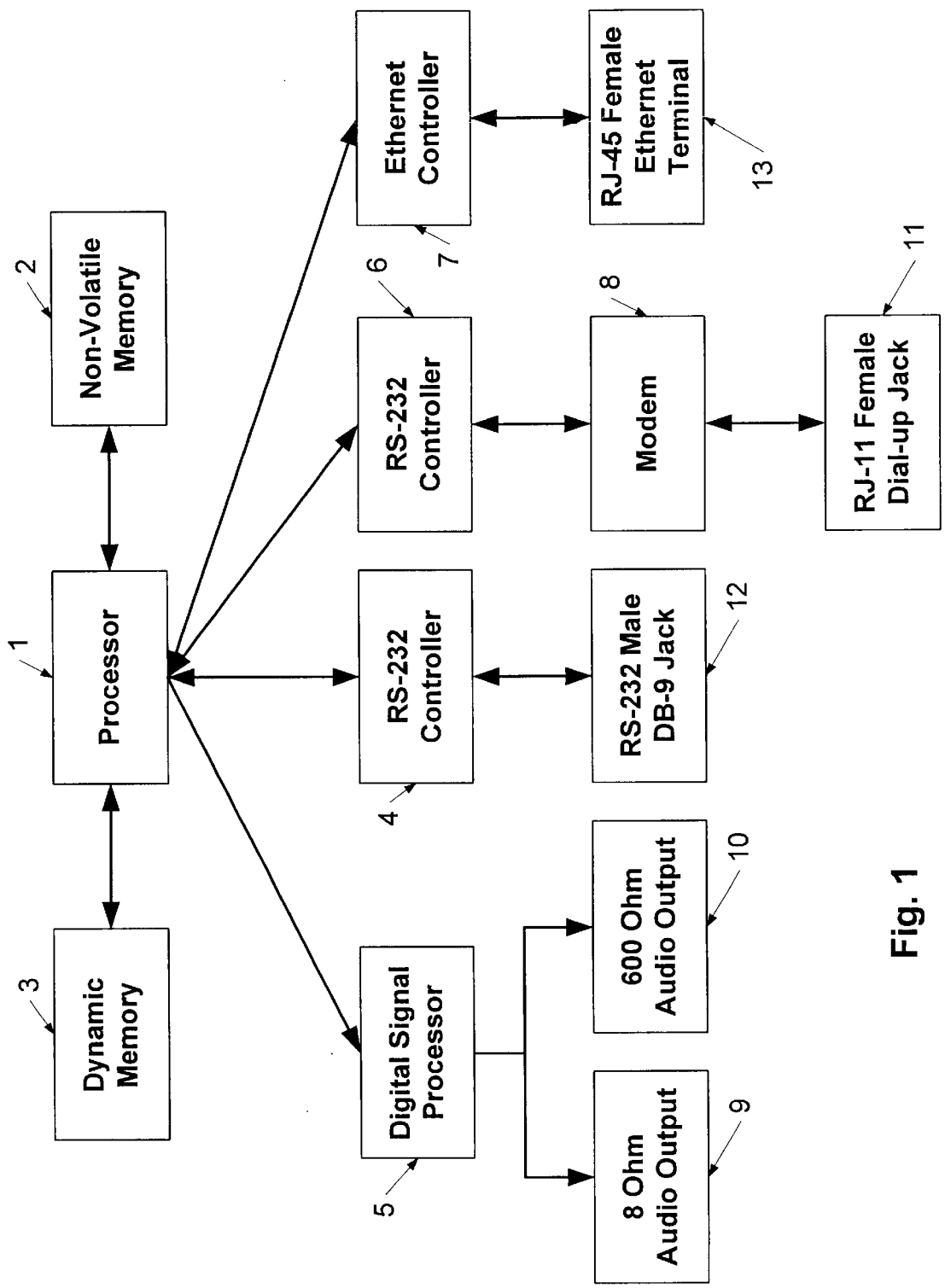
FIG. 1 is a block diagram of one embodiment of the local device component of the invention.

The present local message on hold device, contacts and interacts with a server, in order to retrieve from the server the audio programming which, if any, is installed and alters the audio programming on the local message on hold device. The local device may interact with said server by any sort of electronic communication medium capable of transmitting digital information, such as binary code or as binary code embedded in a text format based on ASCII, referred to herein as a communications link. The local device is classified as a proactive device because it initiates contact with said server on a preprogrammed schedule invoked by comparison with said schedule and its internal clock, which may be built into the internal circuitry of the local device.

One aspect of the present invention is a system comprising a plurality of local devices, each comprising in operable combination a central processing unit, a digital signal processing unit, a digital to an analog converter, a communications link device, random access memory, nonvolatile random access memory, electronically programmable read-only memory, read-only memory and operating system software and associated with a telephone system to supply messages, music or combinations thereof when a caller to a telephone system is on hold. Each local device will connect to the server by a communication link. The local devices are preferably programmed to initiate contact with the server at spaced intervals such that the interrogation and downloading of new audio programs from the server will proceed at the fastest speed, although the server may handle more than one local device at one time with somewhat reduced speed. After a local device has downloaded and installed the new audio program, it returns to regular message on hold service with an associated phone system.

In one embodiment the local device identifies itself to said server for security reasons, then checks specific areas within the storage system of said server to see if there are programming changes available for the local device. If there are no changes available in the storage system of the server; the local device terminates its link to the server and then resumes normal operation. If, however, there are changes available to the local device, it downloads the files necessary to implement those changes prior to terminating its link with said server. The local device then implements the programming changes made available to it via the communications link with the server. Upon completing implementation of the changes found on the server, the local device then resumes normal operations.

The local device executes internal programming that runs on its own operating system that is itself software written for, or specifically configured for, this particular local device to communicate with a server comprising specifically configured combination of software and hardware used to hold or store audio programming and other information to verify that the audio program being played on the local device over a music on hold compatible telephone system, or other message output device, is current and correct.

Preferably the operating system for the local device self-boots upon power up for the first time. As part of the boot up process, the operating system determines the type of communications link or links available. The operating system will then launch the internal programming, which will then contact the server via one of the communications links it has available, such as, by the means of submitting a universal resource locator over the Internet. The internal programming of the local device will then inform the server of its serial number or transmit other information that identifies the particular local device to the server. The server will then direct the local device to the areas within its storage system, which have been assigned to that particular local device. The internal programming then saves the directories allotted to the particular local device within its memory system. Thereinafter, in this embodiment, the internal program will only need to log onto the server and search its assigned areas of the server without further instructions from the server, as describe above. This is important, as it relieves the server of the need to track the wait states of numerous local devices on the total system as they log on. The server need merely keep a log of which local device logged on at what time, thus greatly reducing server clock cycle consumption per local device connection.

The internal program will download a file or files that encloses or will enclose a parameter set from the server. The parameter set is a set of parameters the internal program will use to cause the local device to carry out its design functions. In this respect, the present local device differs from prior playback devices in that it actively checks to see if it needs to change its audio program and, upon finding that such a need has arisen, carries out the necessary changes without the supervision of a human operator.

The parameter set may have, but will not necessarily be limited to, the following parameters:

1) Universal Resource Locators for the areas of the server storage system which have been assigned to a particular local device.
2) The log on schedule for a particular local device.
3) An inventory of files a particular local device should have stored in its memory, including the files needed by the audio program.
4) The audio program order of play for a particular local device.
5) The audio program EQ settings for a particular local device.
6) Special instructions necessary for a particular local device, such as special log on instructions needed to access the server through an ISP or the firewall of a network, or possibly, a storage system not connected directly to the Internet.
7) Security parameters as required.
8) Clock synchronization instructions as required.
9) Settings for special file handling protocols, FTP, TFTP, and the like.

The internal program will download the parameter set from the server and compare that parameter set to the resources it has stored in the local device memory. The internal program will delete from the local device's memory any files it has on hand which are not within the parameter set. Any files the local device does not have stored in memory, the internal program will proceed to download from the server. Once the internal program determines that it has all the files necessary for the audio program, it will then terminate contact with the server and execute the audio program per the order of play given it by the parameter set.

Subsequent to the initial download and set up of the audio program, the internal program will compare the time and date given in the log on the schedule found in the parameter set, to the time and date registered by the operating system from the system clock incorporated into the hardware. When the time and date given by the parameter set is reached, the internal program will then communicate with the server and download the current parameter set that now resides on the server. If the newly downloaded parameter set is the same as the parameter set the local device currently has stored in its memory, the internal program will then log off the server and have the local device resume normal operation. If the newly downloaded parameter set is different from the parameter set the local device previously held in its memory, the program will proceed through the steps described herein above.

In an alternative embodiment, after the local device has contacted the server, the server interrogates the local device to determine if the server has updated material for the local device and if it does, the server downloads the new audio program to local device for installation therein.

Communications between the local device and the server may go through a hardware communications port capable of, such as, the following kinds of electronic communications links, RS-232, dial up modem of varying baud rates, various forms and standards of Ethernet interfaces, various forms and standards of fiberoptic communications or other digital networking communications protocols of differing design, layers and packet protocols, such as TCP/IP, IPX, and the like. The local device operating system will, in most cases, be capable of handling virtually any communications protocol now in current use and adaptable to those adopted as standard in the future, because it will be possible to write software commensurate with the needs of changing digital communications methods or standards, such as TCP/(IP 6.0).

The local device will typically store all files to be used in the audio program as binary files formed by a suitable audio codec such as, but not limited to, the Motion Pictures Experts Group Layer Three (popularly known as "mp3"). The internal program is capable of being adapted to use improved codecs or alternative codecs as they become available and are adopted by the audio industry for general use. A "codec" as that term as used herein is understood to mean a piece of software capable of both compressing and decompressing digital audio files for efficient storage.

The operating system is capable of treating nonvolatile random access memory as being the same thing as the more commonly used magnetic file storage devices such as floppy diskettes or hard disks, which allow any file to be accessed, played or executed in any desired order.

The operating system, the internal program, the auxiliary software, such as device drivers and communications protocol stacks, and the audio program preferably will be executed in volatile random access memory in the current device, but may use nonvolatile random access memory throughout. The nonvolatile random access memory currently available has latency issues which can make quality audio playback problematical, and it does fail beyond a set number of uses, however, when used as storage, rather than memory, the failure rate and latency of currently available nonvolatile random access memory is acceptable in this application. Nonvolatile random access memory is superior to other available information storage devices in this application, largely because it lacks moving parts and is more tolerant of changes in temperature and is far less likely to suffer damage from vibration or handling during shipping, or loss of data or garbled programming caused by an unanticipated power outage.

Audio output may be through a standard audio cable connection commonly called an RCA jack, but it need not be limited to that type of form factor. Stereo, stereo mini, RJ-11, or other form factors may be used by the present local device. Audio output can also be organized to any standard used by the audio industry, whether monaural, stereo, surround sound, low impedance, high impedance, with balanced or unbalanced cables, SPDIF, and the like, and capable of using any noise reduction standard or audio I/O standard required for a given application.

The local device need not necessarily be configured to use compressed audio files. In an application where the need for very high quality audio is sufficient to justify the cost, the local device may be configured in such a way as to use uncompressed audio files in any digital storage format including but not limited to, CDA, DAT, WAV, AIFF, SoundDesigner2™, and the like.

The local device may be configured to handle and play audio programs of virtually any length, provided the increased cost of the device is justified by the need for lengthy programming.

In most cases, the least costly means for the local device to use in communicating with the server is via the Internet. However, it may be programmed to contact a Bulletin Board Service (BBS) by dialing a WATS line number. Although the majority of the local devices will almost certainly receive their programming over the Internet via telephone line and modem, the programming may be received via the Internet over a computer network owned and operated by the user, whenever such a network is connected to the Internet.

Referring now to FIG. 1 the local device component is depicted in block diagram form. A process 1 is connected to nonvolatile memory 2, dynamic memory 3, a first RS 232 controller 4, a digital signal processor 5, a second RS 232 controller 6 and an Ethernet controller 7. Programs and data for the processor 1 are resident in nonvolatile memory 2 and loaded to dynamic memory 3 at runtime. The first RS 232 controller 4 is connected to a RS 232 Male DB-9 Jack 12 which allows terminal access to the processor 1. The digital signal processor 5 converts digital audio data from the processor 1 into an analog signal for the connected 8-Ohm audio output 9 and the connected 600-Ohm audio output 10 wither of which may be connected to the audio input of a telephone system. The second RS 232 controller 6 is connected to a modem 8 which is in turn connected to an RJ-11 female dial-up jack 11. The processor 1 connects to the Internet through the second RS 232 controller 6, the modem 11 and RJ-11 female dial-up jack. When Ethernet access to the internet is available, the Ethernet controller 7 allows both faster Internet access than the second RS 232 controller 6, modem 11 and RJ-11 jack. The Ethernet controller also allows faster terminal access than the first RS 232 controller 4 connected to the RS 232 male DB-9 jack 12.

Figure 2:
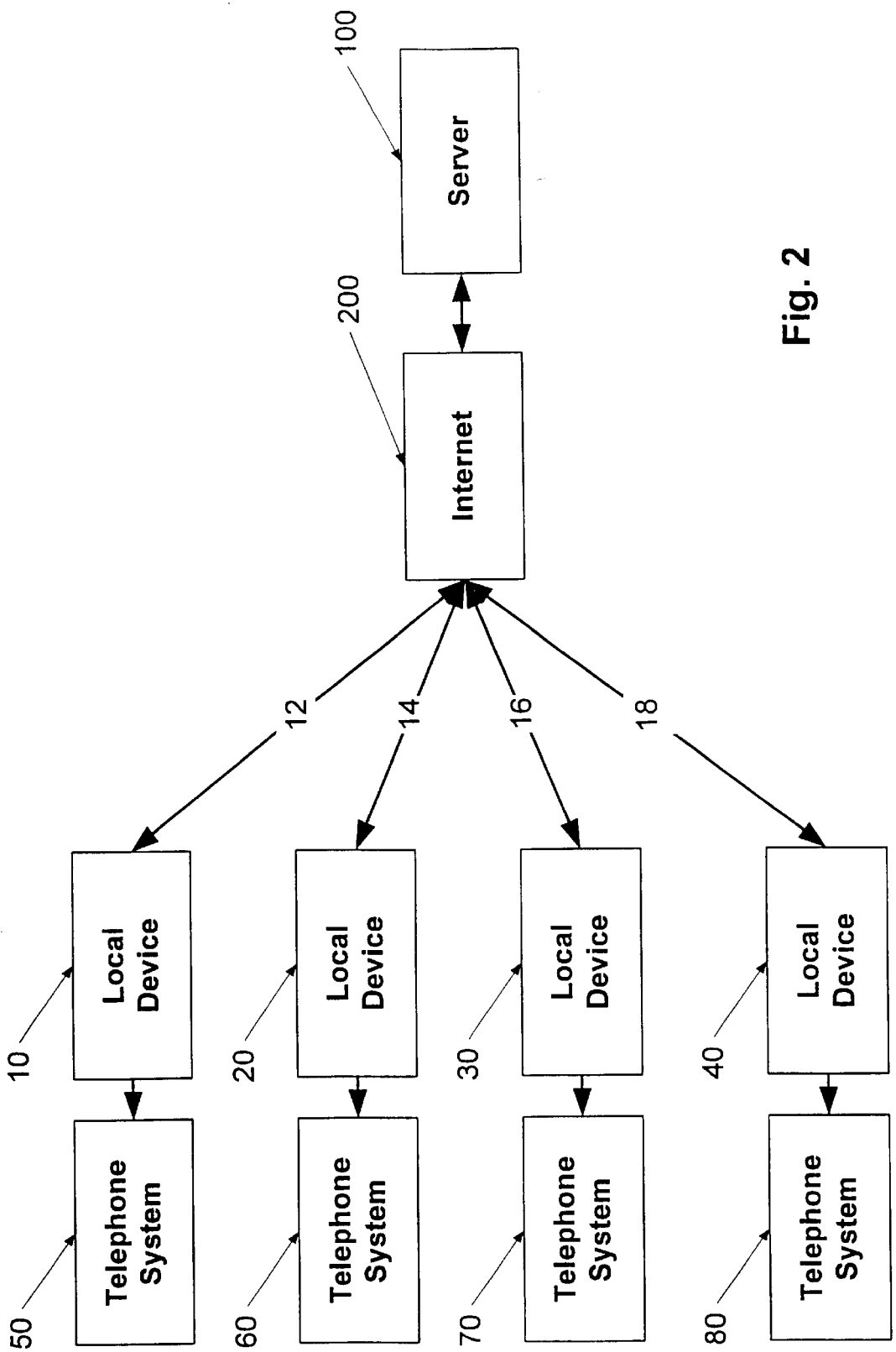
FIG. 2 is a block diagram of one embodiment of the system showing several local use devices connected to a central server.

Referring now to FIG. 2 a schematic representation of the one embodiment of the system which includes several local devices. The server 100 contains the audio messaging data as noted above and may be accessed by data linkage, here through the internet 200. Each local device 10, 20, 30, and 40 may access the internet 200 by its individual Ethernet controller or RS 232 controller via modem via data links, 12, 14, 16, and 18 respectively. Each local device is connected to the individual telephone systems 50, 60, 70 and 80.

The invention claimed is:

1. A system for updating messages on hold audio programs comprising:
   a local device programmed to play an audio program for broadcast over telephone lines and for a) initiating contact with a server, b) determining if audio program changes are available from said server for said local device, c) downloading files for said local device from said server and d) installing the audio programming changes into said local device,
   a communication link and
   said server for storing program changes for said local device and being operably connected to said local device through said communication link.

2. The system according to claim 1 wherein said local device determines if audio program changes are available from said server for said local device and download files for said local device from said server.

3. The system according to claim 1 wherein said server determines if audio program changes are available from said server for said local device and download files for said local device from said server.

4. The system according to claim 1 wherein said local device comprises in operable combination a central processing unit, a digital signal processing unit, a digital to analog converter, a communications link device, random access memory, nonvolatile random access memory, electronically programmable read-only memory, read-only memory and operating system software.

5. The system according to claim 1 where in said electronic link comprises an electronic communication medium capable of transmitting digital information.

6. A local device for playback of messages to music on hold compatible telephone systems and other message output devices, comprising in operable combination a central processing unit, a digital signal processing unit, a digital to analog converter, a communications link device, random access memory, nonvolatile random access memory, electronically programmable read-only memory, read-only memory and operating system software.

7. The method for automated updating of a local device programmed for storing and playing messages telephonically to callers on hold comprising a local device carrying out the steps of:
   a) initiating electronic communication to a server,
   b) identifying the local device to said server,
   c) securing access to areas within the storage system of said server
   d) determining if audio programming changes are available in said storage system for said local device,
   e) downloading the files necessary to implement changes by the local device from said server,
   f) terminating the electronic communication to said server, and
   g) implementing the audio programming changes made available to it via the communications link with the server.

8. The method according to claim 7 wherein said local device is programmed to contact said server at a specific time.

9. The method for automated updating of a plurality of local devices programmed for storing and playing messages telephonically to callers on hold comprising each said local device:
   a) initiates electronic communication to a server,
   b) identifies the local device to said server,
   c) secures access to areas within the storage system of said server
   d) determines if audio programming changes are available in said storage system for said local device,
   e) downloads the files necessary to implement changes by the local device from said server,
   f) terminates the electronic communication to said server, and
   g) implements the audio programming changes made available to it via the communications link with the server.

10. The method according to claim 9 wherein each said local device is programmed to contact said server at a specific time.

11. The method for automated updating of a local device programmed for storing and playing messages telephonically to callers on hold comprising said local device:
   a) initiating electronic communication to a server, and said server:
      a) identifying the local device,
      b) determining if audio programming changes are available in said storage system for said local device and
      c) downloading the files necessary to implement changes by the local device from said server.

12. The method for automated updating of a plurality of local devices programmed for storing and playing messages telephonically to callers on hold comprising each said local device:
   a) initiates electronic communication to a server, and said server:
      a) identifies the local device,
      b) determines if audio programming changes are available in said storage system for said local device and
      c) downloads the files necessary to implement changes by the local device from said server.

* * * * *